US012607348B2

(12) United States Patent　　　　　(10) Patent No.:　US 12,607,348 B2
Liu et al.　　　　　　　　　　　　　　(45) Date of Patent:　Apr. 21, 2026

(54) MIXED COMBUSTION SYSTEM FUELED WITH AMMONIA, HYDROGEN AND NATURAL GAS

(71) Applicant: GUANGDONG UNIVERSITY OF TECHNOLOGY, Guangzhou (CN)

(72) Inventors: Xiaozhou Liu, Guangzhou (CN); Gang Chen, Jieyang (CN); Huaming Zhang, Jieyang (CN); Yu Zhang, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 403 days.

(21) Appl. No.: 18/519,770

(22) Filed: Nov. 27, 2023

(65) Prior Publication Data

US 2025/0052416 A1　　Feb. 13, 2025

(30) Foreign Application Priority Data

Aug. 8, 2023　　(CN) .......................... 202310998532.8

(51) Int. Cl.
*F23D 14/02*　　　　(2006.01)
*B01F 23/10*　　　　(2022.01)
(Continued)

(52) U.S. Cl.
CPC .............. *F23D 14/02* (2013.01); *B01F 23/19* (2022.01); *C01B 3/047* (2013.01); *F23C 9/00* (2013.01);
(Continued)

(58) Field of Classification Search
CPC .... B01F 23/19; B01F 2101/501; C01B 3/047; F23C 9/00; F23C 9/08; F23C 2900/9901;
(Continued)

(56) References Cited

U.S. PATENT DOCUMENTS

2014/0105816 A1*　4/2014　Grannell ................... C01B 3/06
　　　　　　　　　　　　　　　　　　　　　　　　422/198
2020/0116429 A1*　4/2020　Kobayashi .............. F27B 3/266
(Continued)

FOREIGN PATENT DOCUMENTS

CN　　　　115419892 A　　12/2022
CN　　　　115614778 A　　1/2023

*Primary Examiner* — Steven B Mcallister
*Assistant Examiner* — Benjamin W Johnson

(57)　　　　　　ABSTRACT

Disclosed is a mixed combustion system fueled with ammonia, hydrogen and natural gas, which comprises a furnace chamber, a combustor, a heat exchanger, a mixer and a storage tank, the combustor and a conical combustion cavity are installed in the furnace chamber, the storage tank is provided with a first branch pipeline through a conveying pipe to be connected with the heat exchanger, the heat exchanger is connected with an inlet of the mixer, and an outlet of the mixer is connected with a fuel inlet of the combustor; and the conveying pipe is provided with a second branch pipeline connected with an ejector port of a first ejector, the first ejector is installed on a flue gas recirculating pipe connected with a furnace chamber flue gas exhaust pipeline, and the other end of the flue gas recirculating pipe is connected with an auxiliary fuel inlet of the combustor.

10 Claims, 3 Drawing Sheets

(51) Int. Cl.

| | |
|---|---|
| *C01B 3/047* | (2026.01) |
| *F23C 9/00* | (2006.01) |
| *F23D 14/26* | (2006.01) |
| *F23D 14/64* | (2006.01) |
| *F23D 14/82* | (2006.01) |
| *F23D 17/00* | (2006.01) |
| *F23K 5/00* | (2006.01) |
| *B01F 101/00* | (2022.01) |
| *F23C 9/08* | (2006.01) |

(52) U.S. Cl.
CPC ............. *F23D 14/26* (2013.01); *F23D 14/64* (2013.01); *F23D 14/82* (2013.01); *F23D 17/002* (2013.01); *F23K 5/002* (2013.01); *B01F 2101/501* (2022.01); *F23C 9/08* (2013.01); *F23C 2900/9901* (2013.01); *F23D 2203/105* (2013.01); *F23D 2204/10* (2013.01); *F23K 2900/01041* (2013.01); *F23K 2900/05004* (2013.01); *Y02E 20/34* (2013.01)

(58) Field of Classification Search
CPC .......... F23D 14/02; F23D 14/26; F23D 14/64; F23D 14/82; F23D 17/002; F23D 2203/105; F23D 2204/10; F23K 5/002; F23K 2900/01041; F23K 2900/05004; Y02E 20/34
USPC .......................................................... 431/116
See application file for complete search history.

(56) References Cited

U.S. PATENT DOCUMENTS

| | | | | |
|---|---|---|---|---|
| 2022/0195919 | A1* | 6/2022 | Akbari | ................... C01B 3/047 |
| 2023/0053230 | A1* | 2/2023 | Jo | ........................... B01J 37/08 |
| 2024/0343561 | A1* | 10/2024 | Ulber | ..................... C01B 3/047 |

* cited by examiner

MIXED COMBUSTION SYSTEM FUELED WITH AMMONIA, HYDROGEN AND NATURAL GAS

CROSS REFERENCE TO RELATED APPLICATIONS

This application claims foreign priority of Chinese Patent Application No. 202310998532.8, filed on Aug. 8, 2023 in the China National Intellectual Property Administration, the disclosures of all of which are hereby incorporated by reference.

TECHNICAL FIELD

The present invention belongs to the technical field of combustion, and particularly relates to a mixed combustion system fueled with ammonia, hydrogen and natural gas.

BACKGROUND OF THE PRESENT INVENTION

In order to achieve the goal of arriving peak value of carbon dioxide emission in 2030 and the goal of realizing carbon neutrality in 2060 in China, it is necessary to comprehensively use various technologies, such as a carbon capture technology and an application of hydrogen energy and ammonia energy with zero carbon emission, and the fundamental means is to reform an energy system and introduce a carbon-free energy source.

Hydrogen ($H_2$) and ammonia ($NH_3$) are common carbon-free energy sources, which have attracted more and more attention in recent years, but these kinds of energy sources are expensive. The replacement of a part of natural gas fuel with the hydrogen ($H_2$) and the ammonia ($NH_3$) can not only reduce carbon emissions, but also avoid excessive fuel prices, thus achieving double benefits. However, at the present stage, traditional combustion equipment is mainly designed for natural gas ($CH_4$), and the additions of hydrogen and ammonia can significantly affect a combustion performance, so that a structure of the traditional combustion equipment must be improved.

The hydrogen ($H_2$) is flammable and explosive, and dangerous to transport, and when the hydrogen ($H_2$) is used as a fuel for direct supply, it is necessary to re-lay a dedicated pipeline for $H_2$ supply, which is difficult to realize currently. In addition, $NH_3$ has a low calorific value, burning stability lower than that of natural gas, and a high N-element content, and it is also necessary to prevent the problem that a nitrogen oxide emission content may exceed a standard value, so that a mixed combustion system fueled with ammonia, hydrogen and natural gas must be redesigned.

The Chinese invention patent application with the application publication number CN115419892A discloses an ammonia-hydrogen mixed combustion boiler system, which comprises a first mixer, an inlet of the first mixer is introduced with hydrogen and a first path of ammonia, and first mixed gas exhausted from the first mixer is heated by a first heat exchanger and then fed into a combustor in a boiler, wherein tail gas exhausted from the boiler heats a second path of ammonia through a second heat exchanger, the second path of ammonia heated enters an ammonia decomposition tower to be decomposed to obtain hydrogen, the hydrogen is recycled to the first mixer, a third path of ammonia and tail gas exhausted from the second heat exchanger are introduced into a second mixer, second mixed gas exhausted from the second mixer is cooled through a second air pre-heater and then fed into a denitration tower to be subjected to flue gas denitration, tail gas exhausted from the denitration tower heats the first mixed gas through the first heat exchanger, and air exhausted from the second air pre-heater is fed into the boiler. According to this invention, the hydrogen is produced by ammonia decomposition and then mixed with the ammonia for combustion, so that the energy utilization and stable combustion of ammonia are realized, and an emission amount of a nitrogen oxide pollutant is reduced by denitrification and flue gas recirculation, but the problems of transportation danger of ammonia and hydrogen and difficult combustion of ammonia cannot be solved, and the combustion efficiency of the system is relatively low.

The Chinese invention patent application with the application publication number CN115614778A discloses an ammonia-hydrogen mixed combustion chamber and an ammonia-hydrogen mixed combustion method, wherein the ammonia-hydrogen mixed combustion chamber comprises a combustion chamber body, an ammonia pyrolysis chamber is arranged inside or outside the combustion chamber body, the ammonia pyrolysis chamber exists in the combustion chamber body or is constructed outside the combustion chamber body by utilizing a wall surface of the combustion chamber body, ammonia in the ammonia pyrolysis chamber is pyrolyzed by utilizing the high-temperature wall surface of the combustion chamber body or a high-temperature environment in the combustion chamber body to generate hydrogen, and the hydrogen enters the combustion chamber body from a hydrogen hole in the ammonia pyrolysis chamber to be mixed with ammonia sprayed by a fuel nozzle of the combustion chamber body and high-pressure air entering the combustion chamber body for combustion, so that ammonia-hydrogen mixed combustion is realized. According to the technical solution of this invention, an ammonia decomposition and hydrogen production device is directly integrated in the combustion chamber, and the high temperature of the wall surface of the combustion chamber is fully utilized to pyrolyze the ammonia, so that a complex ammonia decomposition device separately arranged is omitted, and a structure of the ammonia-hydrogen mixed combustion integrated device is simplified. However, the structure is too complicated, which is not conducive to maintenance, and the fuel combustion efficiency is not high due to the inflammability of ammonia. Moreover, the problem of how to realize co-combustion with natural gas is not involved.

SUMMARY OF THE PRESENT INVENTION

In order to solve the problems in the above background, the present invention provides a safe and environment-friendly mixed combustion system fueled with ammonia, hydrogen and natural gas.

A technical solution adopted by the present invention for solving the technical problems is: a mixed combustion system fueled with ammonia, hydrogen and natural gas, which comprises a furnace chamber, a combustor, a conical combustion cavity, a heat exchanger, a mixer and a storage tank, wherein the combustor is installed on a front end side wall of the furnace chamber, the conical combustion cavity is installed in the furnace chamber, and the heat exchanger is installed in the furnace chamber and located between the combustor and a flue gas exhaust outlet; the storage tank is provided with a pressure reducing valve at an outlet, and provided with a first branch pipeline through a conveying pipe to be connected with the heat exchanger, an outlet of the heat exchanger is connected with an inlet of the mixer, and an outlet of the mixer is connected with a fuel inlet of the combustor; and the conveying pipe is provided with a second branch pipeline connected with an ejector port of a first ejector, the first ejector is mounted on a flue gas recirculating pipe connected with the furnace chamber flue gas exhaust pipeline, and the other end of the flue gas recirculating pipe is connected with an auxiliary fuel inlet of the combustor.

The mixer is connected with a Roots blower through an air pipe to input air into the mixer for adjusting ingredients of the ammonia decomposition mixture after preheated and decomposed.

The air pipe is provided with a branch air pipe to be connected with an ejector port of a second ejector, and the second ejector is mounted on the flue gas recirculating pipe at an outlet of the first ejector for introducing air, so as to adjust the flow of the ejected ammonia and then input the ammonia to the combustor for combustion.

A center of the combustor comprises a first porous ceramic plate, a second porous ceramic plate and a plurality of ceramic balls, and the ceramic balls are filled between the first porous ceramic plate and the second porous ceramic plate.

A diameter of the ceramic ball ranges from 10 mm to 20 mm, a number of ball rows between the first porous ceramic plate and the second porous ceramic plate range from 5 to 8, and the ceramic balls can effectively prevent back-fire accident, thus playing a role of a flame arrester.

A diameter of a through hole in the first porous ceramic plate and the second porous ceramic plate range from 1 mm to 3 mm, which can effectively prevent back-fire accident, thus playing a role of stabilizing flame.

A shell is wrapped outside a center of the combustor to form an annular cavity, the annular cavity is provided with two auxiliary fuel inlets at an inlet and a porous jet plate with an inclination angle at an outlet, the porous jet plate is provided with a plurality of fuel jet holes, and the diameter of the fuel jet hole ranges from 1 mm to 3 mm.

An included angle between the porous jet plate and a center line of an outlet of the combustor is 45 degrees for preventing back-fire accident, thus playing a role of stabilizing flame.

The conical combustion cavity is arranged at the outlet of the combustor.

Two porous plates are arranged on a wall surface on one side of the conical combustion cavity oriented to the combustor, each of the porous plates is provided with a plurality of fuel jet holes, and the diameter of the fuel jet holes ranges from 1 mm to 3 mm for preventing back-fire accident, thus playing a role of stabilizing flame.

Preferably, two porous plates on one side of the conical combustion cavity oriented to the combustor have an inclination angle, and an inclination angle between a centerline of the porous plate and that of the combustor outlet is 45 degrees.

Preferably, a distance between the conical combustion cavity and the center line of the outlet of the combustor ranges from ½ to ⅚ of an outer diameter of the combustor, and a length of the porous plate of the conical combustion cavity ranges from ⅛ to ¹⁄₁₀ of the outer diameter of the combustor.

Compared with the prior art, the present invention has the beneficial effects that: a transportation danger problem of hydrogen is solved; a residual pressure of ammonia and waste heat of furnace chamber flue gas are effectively used to decompose the ammonia into the hydrogen and the nitrogen, a temperature is increased at the same time, and a combustion performance is improved; the back-fire accident can be prevented during the combustion of hydrogen to ensure the stable burning of hydrogen; it is ensured that the ammonia and the natural gas can be both burned out smoothly, without carbon deposition; and a temperature in a combustion zone is relatively gentle, and no local high-temperature zone appears, so that the generation of nitrogen oxide can be reduced, thus solving a problem that nitrogen oxide emissions of ammonia combustion can be increased.

DETAILED DESCRIPTION OF PREFERRED EMBODIMENTS

Figure 1:
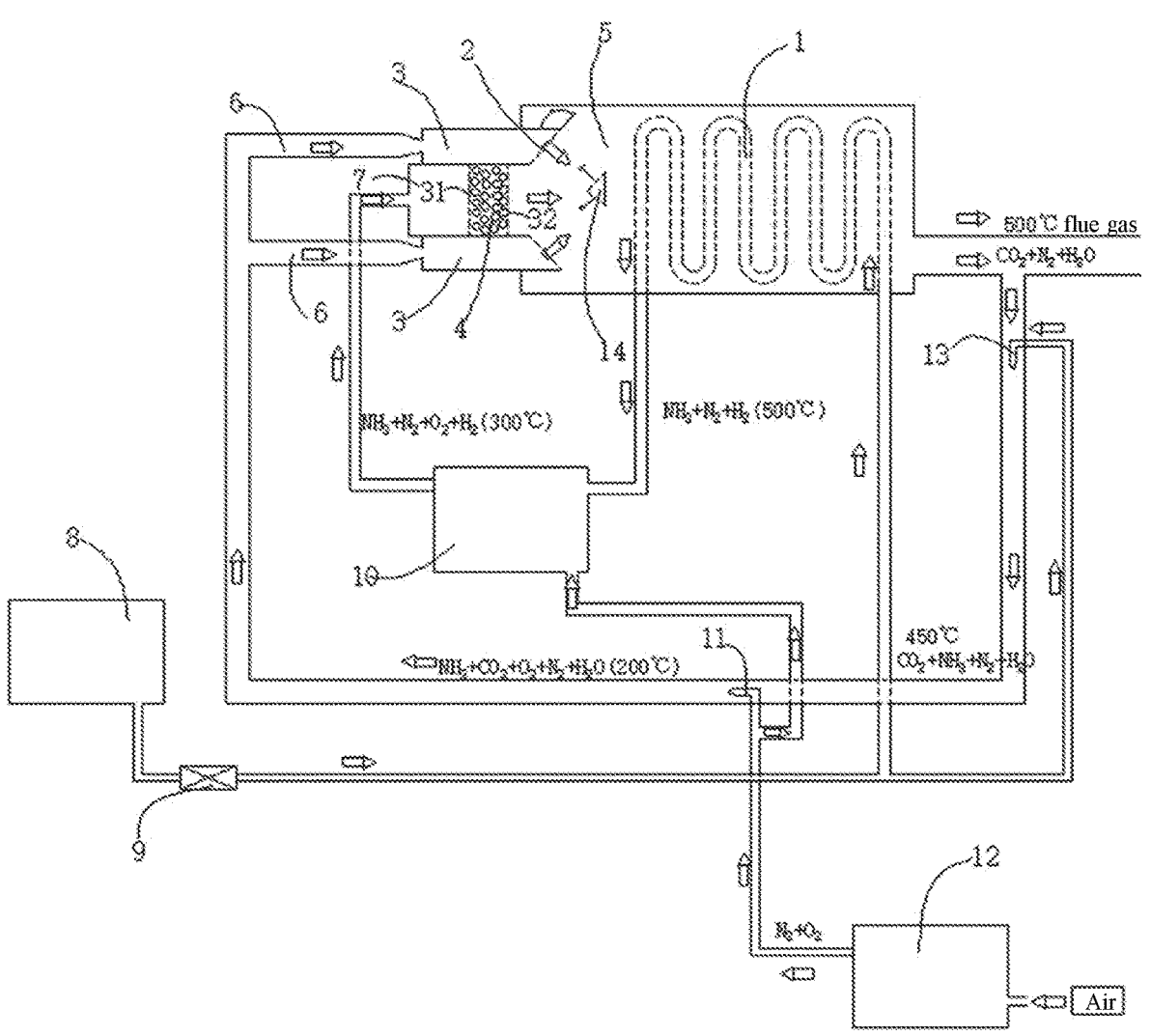
FIG. 1 is a structural block diagram of a mixed combustion system fueled with ammonia, hydrogen and natural gas according to the present invention.

The present invention is further described hereinafter with reference to the drawings. It is worth noting that the specific embodiments are only representative specific embodiments of the present invention, wherein the specific methods, devices, conditions, materials, and the like illustrated are not intended to limit the present invention or the corresponding specific embodiments. Therefore, each device in the drawings is only used for expressing the relative position and is not drawn according to the actual proportion, which should be cleared first. In addition, the description of front and back orientations herein takes FIG. 1 as a reference standard, and an arrow in the figure is marked as a flowing direction of a fluid.

A mixed combustion system fueled with ammonia, hydrogen and natural gas, as shown in FIG. 1, comprises a furnace chamber 5, a combustor 7, a conical combustion cavity 14, a heat exchanger 1, a mixer 10, a storage tank 8 and a Roots blower 12. The combustor 7 is installed on a front end side wall of the furnace chamber 5, the conical combustion cavity 14 is installed in the furnace chamber 5, and the heat exchanger 1 is installed in the furnace chamber 5 and located between the combustor 7 and a flue gas exhaust outlet. The storage tank 8 is provided with a pressure reducing valve 9 at an outlet, and provided with a first branch pipeline through a conveying pipe to be connected with an inlet of the heat exchanger 1, an outlet of the heat exchanger 1 is connected with an inlet of the mixer 10, and an outlet of the mixer 10 is connected with a fuel inlet of the combustor 7; and the conveying pipe is provided with a second branch pipeline connected with an ejector port of a first ejector 13, the first ejector 13 is installed on a flue gas recirculating pipe connected with a furnace chamber flue gas exhaust pipeline, and the other end of the flue gas recirculating pipe is connected with an auxiliary fuel inlet 6 of the combustor 7. The Roots blower 12 is connected with the mixer 10 through an air pipe to input air into the mixer 10 for providing oxygen for the premixed combustion of an ammonia decomposition mixture after preheating and decomposition.

The air pipe is provided with a branch air pipe to be connected with an ejector port of a second ejector 11, and the second ejector 11 is mounted on the flue gas recirculating pipe at an outlet of the first ejector 13 for introducing air, so as to adjust the flow of mixed gas of ejected ammonia and flue gas. Then, the mixed gas is fed into the annular cavity 3 of combustor 7 through auxiliary fuel inlet 6 and then injected into furnace chamber 5 for combustion.

An air cap is arranged in the mixer 10, the air cap is connected with a pipeline at the outlet of the heat exchanger 1, and the air cap is provided with an air outlet for evenly filling the mixed gas of hydrogen and nitrogen after preheated and decomposed into the mixer 10. Air tangentially enters the mixer 10 through an air inlet of the mixer 10, and strongly stirs the mixed gas, thus mixes with mixed gas more evenly.

Figure 2:
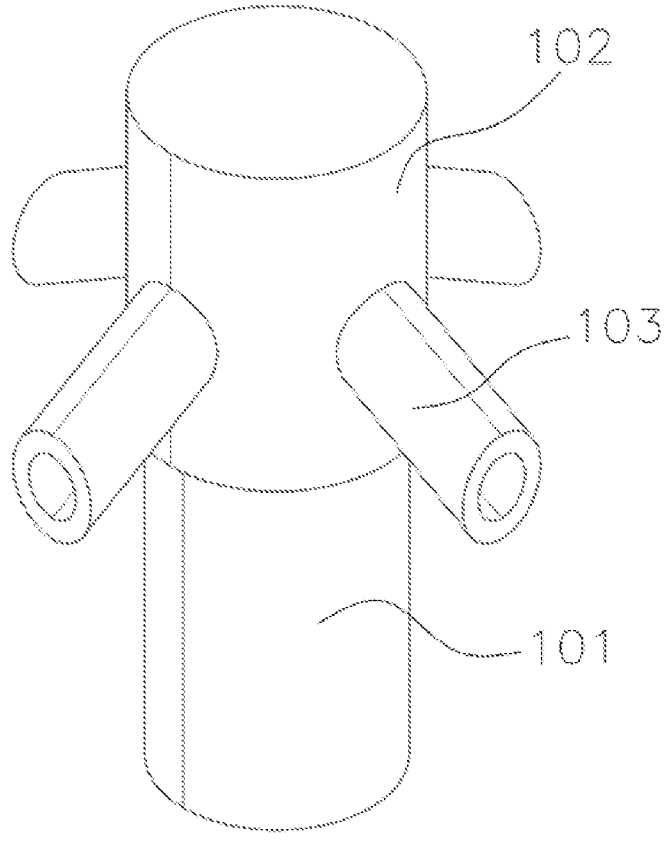
FIG. 2 is a stereoscopic structural diagram of an air cap.
Figure 3:
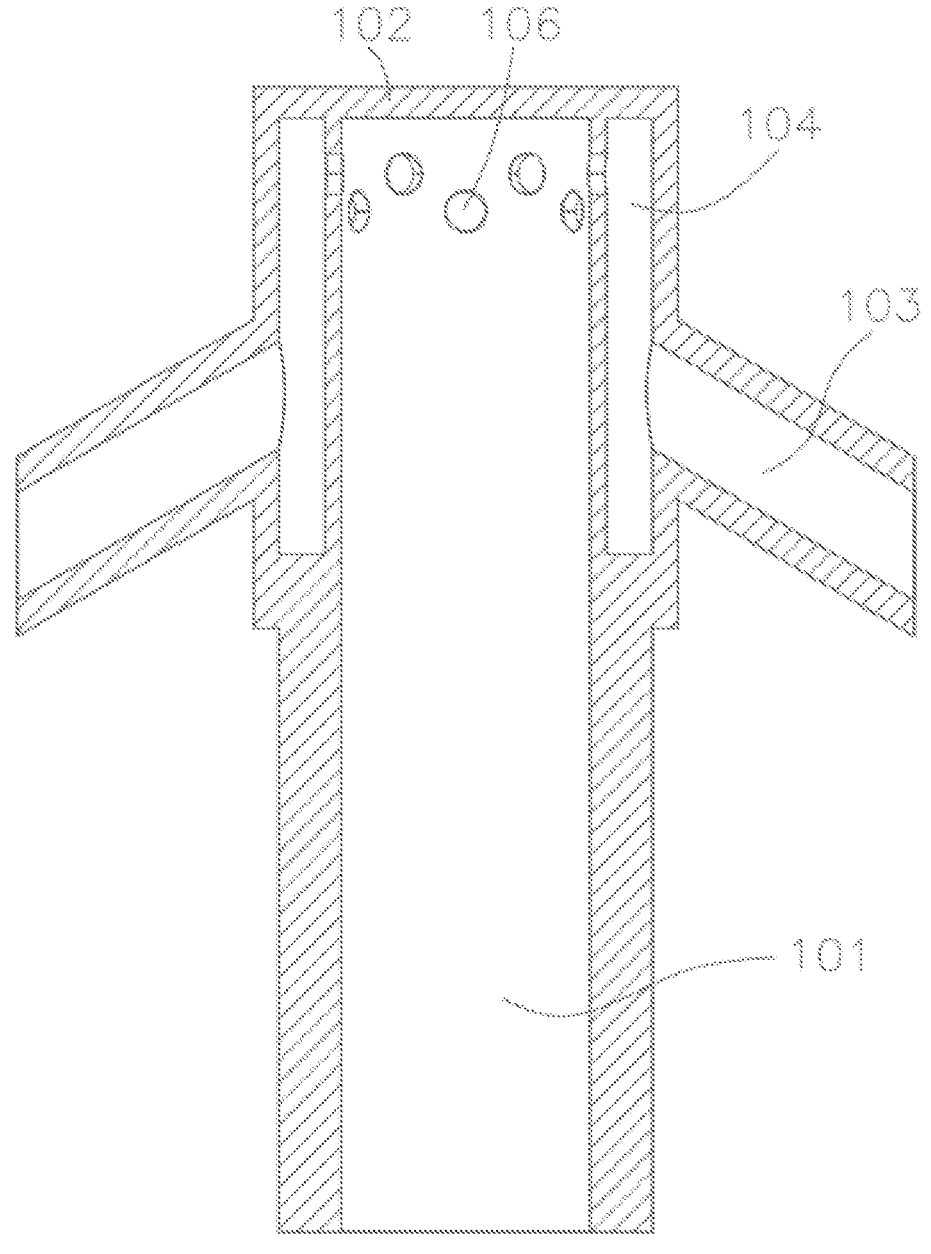
FIG. 3 is a cross-sectional view along an axis of the air cap.

Preferably, a plurality of air caps are arranged in the mixer 10, and preferably, four air caps are provided, which are respectively connected with the pipeline at the outlet of the heat exchanger 1. As shown in FIG. 2 and FIG. 3, the air cap comprises an air guide pipe 101, a cap body 102 and an air outlet pipe 103, the cap body 102 is mounted at a top end of the air guide pipe 101, a side wall of the cap body 102 is provided with an air guide cavity 104 connected with the air guide pipe 101 through a through hole 106, the air outlet pipe 103 is fixed on a side wall of the cap body 102, and an air outlet in the air outlet pipe 103 is connected with the air guide cavity.

Preferably, 20 through holes are provided, which are staggered in upper and lower rows. A width of the air guide cavity is 90 mm. An outlet of the air outlet pipe 103 is set to be inclined downwardly at an inclination angle of 40 degrees. Preferably, four air outlet pipes 103 are provided, which are evenly distributed on a side wall of the cap body 102. The ammonia is input through the above air cap structure and the mixed gas of hydrogen and nitrogen is stirred by tangentially input air, thus mixing more evenly.

The transportation of liquid ammonia is convenient and safe, so that, in the present application, the liquid ammonia is conveyed to a user by the storage tank 8 first, and then depressurized by the pressure reducing valve 9 to form 0.8 MPa ammonia. Meanwhile, the depressurized ammonia absorbs waste heat of high-temperature flue gas in the furnace chamber 5 through the heat exchanger 1, and the ammonia is directly decomposed into the mixed gas of hydrogen and nitrogen, thus solving a problem of transportation danger of hydrogen. That is to say, the transportation of hydrogen and ammonia is changed into the transportation of liquid ammonia, so that a safety factor is greatly improved. The depressurized ammonia is divided into two paths, one path of ammonia enters a flue gas recirculating pipe which is the bypass of the furnace chamber flue gas exhausting pipe, and a part of high-temperature flue gas is sucked by utilizing a high-pressure ejection and suction function of the first ejector 13 and mixed with the depressurized ammonia for heating, so that not only waste heat of flue gas is recycled, but also the self-circulation of carbon dioxide is realized, which not only improves a burning performance of ammonia, but also reduces carbon dioxide emission, thus achieving double benefits. The other path of ammonia enters the heat exchanger 1 in the furnace chamber, and the depressurized ammonia absorbs waste heat of high-temperature flue gas in the furnace chamber through the heat exchanger 1, so that the ammonia is directly decomposed into the hydrogen and the nitrogen, and a temperature is increased at the same time, thus improving the burning performance.

A channel center of the combustor 7 comprises a first porous ceramic plate 31, a second porous ceramic plate 32 and a plurality of ceramic balls 4, and the ceramic balls 4 are filled between the first porous ceramic plate 31 and the second porous ceramic plate 32. Preferably, a diameter of the ceramic ball is 15 mm, and the number of rows between the first porous ceramic plate 31 and the second porous ceramic plate 32 is 6, which can effectively prevent combustion and tempering. A through hole is arranged in the first porous ceramic plate 31 and the second porous ceramic plate 32, with a hole diameter of 2 mm, which can not only effectively prevent back-fire accident, but also play a role of stabilizing flame. A part of ammonia is decomposed into the hydrogen and the nitrogen, and then mixed with air and undecomposed ammonia in the mixer 10 to enter the center of the combustor 7, and the mixed gas passes through the first porous ceramic plate 31, the ceramic balls 4 and the second porous ceramic plate 32 in sequence, and then is injected into the furnace chamber for combustion, which can prevent back-fire accident during the combustion of hydrogen. Meanwhile, because the combustion is carried out on a surface of the second porous ceramic plate 32, the second porous ceramic plate 32 has good heat resistance, may be burned red without being damaged, and plays a role of a flame stabilizing plate, which can ensure the stable ignition and combustion of ammonia.

A shell is wrapped outside the center of the combustor 7 to form an annular cavity 3, the annular cavity 3 is communicated with two auxiliary fuel inlets 6, a fuel jet portion located at an outlet of the annular cavity is provided with a porous jet plate 2 with an inclination angle, and the conical combustion chamber 14 is mounted in the furnace chamber 5 at the outlet of the combustor 7. Preferably, an included angle between the porous spray plate 2 and a center line of the outlet of the combustor 7 is 45 degrees. The diameter of the fuel jet holes in the porous jet plate 2 are 2 mm for preventing back-fire accident, thus playing a role of stabilizing flame. A porous plate is arranged on a side wall of the conical combustion cavity 14 oriented to the combustor, and the diameter of the fuel jet holes in the porous plate are 2 mm for preventing back-fire accident, thus playing a role of stabilizing flame. Preferably, two porous plates on one side of the conical combustion cavity 14 oriented to the combustor have an inclination angle, and an included angle between the inclination angle and the center line of the outlet of the combustor is 45 degrees. A distance between the conical combustion cavity 14 and the center line of the outlet of the combustor is ⅔ of an outer diameter of the combustor 7, and a length of the porous plate of the conical combustion cavity is ⅑ of the outer diameter of the combustor 7.

Mixed gas composed of ammonia, carbon dioxide, oxygen, hydrogen and water vapor in air at a temperature of about 200° C. enters the annular cavity 3, and is injected from the porous spray plate 2 made of metal with an inclination angle of 45 degrees for combustion. Although the ammonia has poor burning performance, the ammonia is very easy to burn because the gas fuel has been preheated to 200 degrees. Meanwhile, the ammonia is not easy to combust, so that the porous spray plate 2 may play a role in high-temperature combustion. Natural gas and air are mixed and then enter the conical combustion chamber 14, and then the mixed gas is injected from the porous plate on a rear side for combustion, which forms counterflow flame with the ammonia fuel injected from the porous spray plate 2 with the inclination angle of 45 degrees, so that it is ensured that the ammonia and the natural gas may both be burnt out smoothly, without carbon deposition. Meanwhile, because a combustion zone of natural gas is far away from a central porous medium combustion zone, a temperature in the combustion zone is relatively gentle, and there may be no local high-temperature zone, so that the generation of nitrogen oxide can be reduced. Air used for combustion is conveyed into fuel gas by the Roots blower before combustion to be fully mixed with the fuel gas, and a porous medium and the porous plate are used to prevent back-fire accident, with a fast combustion speed and high efficiency, so that the mixed combustion system is far better than an ordinary diffusion natural gas combustor. Therefore, it is ensured that the ammonia combusts and burns out smoothly The above are only the preferred embodiments of the present invention, and are not intended to limit the implementation scope of the present invention, which means that all simple equivalent changes and modifications made according to the scope of the patent for application of the present invention and the contents of the description of the present invention should all belong to the scope of the patent of the present invention.

We claim:

1. A mixed combustion system fueled with ammonia, hydrogen and natural gas, comprising a furnace chamber, a combustor, a conical combustion cavity, a heat exchanger, a mixer and a storage tank, wherein the combustor is installed on a front end side wall of the furnace chamber, the conical combustion cavity is installed in the furnace chamber, and the heat exchanger is installed in the furnace chamber and located between the combustor and a flue gas exhaust outlet; the storage tank is provided with a pressure reducing valve at an outlet, and provided with a first branch pipeline through a conveying pipe to be connected with the heat exchanger, an outlet of the heat exchanger is connected with an inlet of the mixer, and an outlet of the mixer is connected with a fuel inlet of the combustor; and the conveying pipe is provided with a second branch pipeline connected with an ejector port of a first ejector, the first ejector is installed on a first end of a flue gas recirculating pipe connected with the flue gas exhaust outlet, and an opposite end of the flue gas recirculating pipe is connected with an auxiliary fuel inlet of the combustor.

2. The mixed combustion system fueled with ammonia, hydrogen and natural gas according to claim 1, wherein the inlet of the mixer is connected with a Roots blower through an air pipe to input air into the mixer.

3. The mixed combustion system fueled with ammonia, hydrogen and natural gas according to claim 2, wherein the air pipe is provided with a branch air pipe to be connected with an ejector port of a second ejector, and the second ejector is installed on the flue gas recirculating pipe at an outlet of the first ejector.

4. The mixed combustion system fueled with ammonia, hydrogen and natural gas according to claim 3, wherein the combustor comprises a first porous ceramic plate, a second porous ceramic plate and ceramic balls, and the ceramic balls are filled between the first porous ceramic plate and the second porous ceramic plate.

5. The mixed combustion system fueled with ammonia, hydrogen and natural gas according to claim 4, wherein a diameter of the ceramic balls ranges from 10 mm to 20 mm, and a number of rows of the ceramic balls between the first porous ceramic plate and the second porous ceramic plate range from 5 to 8.

6. The mixed combustion system fueled with ammonia, hydrogen and natural gas according to claim 4, wherein a diameter of holes of the first porous ceramic plate and the second porous ceramic plate range from 1 mm to 3 mm.

7. The mixed combustion system fueled with ammonia, hydrogen and natural gas according to claim 6, wherein a shell is wrapped outside a center of the combustor to form an annular cavity, the annular cavity is provided with two auxiliary fuel inlets at an inlet and a porous jet plate with an inclination angle at an outlet, and the porous jet plate is provided with a fuel jet hole.

8. The mixed combustion system fueled with ammonia, hydrogen and natural gas according to claim 7, wherein an included angle between the porous jet plate and a center line of an outlet of the combustor is 45 degrees, and a diameter of the fuel jet hole ranges from 1 mm to 3 mm.

9. The mixed combustion system fueled with ammonia, hydrogen and natural gas according to claim 7, wherein the conical combustion cavity is arranged at the outlet of the combustor, two porous plates on one side of the conical combustion cavity oriented towards the combustor have an inclination angle, the porous plates of the conical combustion cavity are each provided with a fuel jet hole, an inclination angle between a centerline of the porous plate and that of the combustor outlet is 45 degrees, and a diameter of the fuel jet holes of the porous plates of the conical combustion cavity ranges from 1 mm to 3 mm.

10. The mixed combustion system fueled with ammonia, hydrogen and natural gas according to claim 9, wherein a distance between the conical combustion cavity and the center line of the outlet of the combustor ranges from ½ to ⅚ of an outer diameter of the combustor, and a length of at least one plate of the porous plates of the conical combustion cavity ranges from ⅛ to ⅒ of the outer diameter of the combustor.

\* \* \* \* \*